April 13, 1926. 1,580,819
L. C. GARMAN ET AL
AUTOMOBILE HEADLIGHT
Filed Dec. 28, 1923 2 Sheets-Sheet 1

Inventors.
Lauritz C. Garman
Walter M. Coleman
By Charles B. Mann Jr.
Attorney

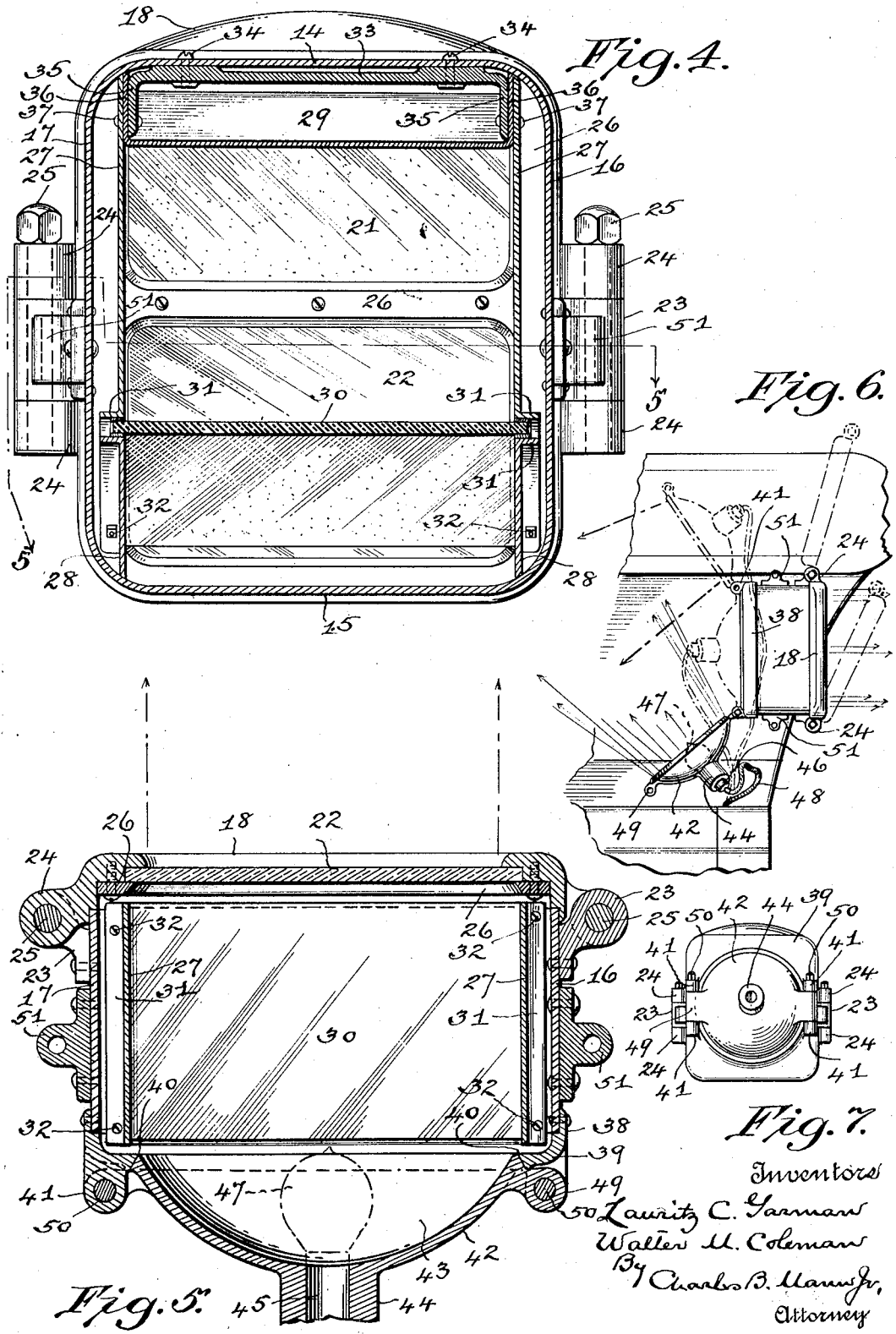
April 13, 1926.  
L. C. GARMAN ET AL  
1,580,819  
AUTOMOBILE HEADLIGHT  
Filed Dec. 28, 1923  
2 Sheets-Sheet 2

Patented Apr. 13, 1926.

1,580,819

UNITED STATES PATENT OFFICE.

LAURITZ C. GARMAN AND WALTER M. COLEMAN, OF BALTIMORE, MARYLAND.

AUTOMOBILE HEADLIGHT.

Application filed December 28, 1923. Serial No. 683,115.

*To all whom it may concern:*

Be it known that LAURITZ C. GARMAN and WALTER M. COLEMAN, citizens of the United States, residing at Baltimore, in the State of Maryland, have invented certain new and useful Improvements in Automobile Headlights, of which the following is a specification.

Our invention relates to improvements in vehicle lamps and has particular reference to a lamp for use on automobiles.

One object of the invention is to provide an improved construction of lamp whereby the rays of light will be directed over the road in such a way as to thoroughly illuminate the same for the driver but which will not produce light rays that will be blinding or interfere with the driver of an approaching vehicle from an opposite direction.

Another object of the invention is to provide an improved construction of light-rays projecting means and to also provide a novel arrangement of front lenses.

A further object is to provide an improved construction of lamp-body wherein the interior parts are accessible by reason of a hinged lens-frame and to mount said frame so that it may be swung in either of two directions whereby the lamps may be mounted at either the right or left side of the vehicle and thus avoid the necessity of providing right and left lamps.

A still further object is to provide an improved construction of lamp-body wherein the lamp-carrier or mounting may readily be swung from the rear of the body or entirely detached from the latter and utilized to illuminate the engine or other parts to the rear of the lamp-body.

Another object of the invention is to provide an improved construction of lamp whereby an expensive or specially designed front lens is not required so that replacement in case of breakage may be made at a minimum cost.

Lamps having round lenses in the front thereof require frequent adjustment of the lenses due to the fact that the lenses, being circular, do not remain in proper position, but tend to rotate about the axis of the lamp. This is particularly annoying and undesirable with those lenses designed to bend or deflect the projected beam of light in a definite direction, as the deflected beams will not be in the desired location unless the lens remains in a predetermined position. By means of the present invention all possibility of annoyance from this source is eliminated.

With these, and other objects in view, the invention is illustrated in the accompanying drawings, wherein,—

Fig. 4 illustrates a vertical cross-sectional detail through the lamp body looking toward the front thereof, as the same would appear if viewed on the line 4—4 of Fig. 3.

Fig. 5 shows a sectional plan view through the lamp-body, the section being taken on the line 5—5 of Fig. 4.

Figure 1:
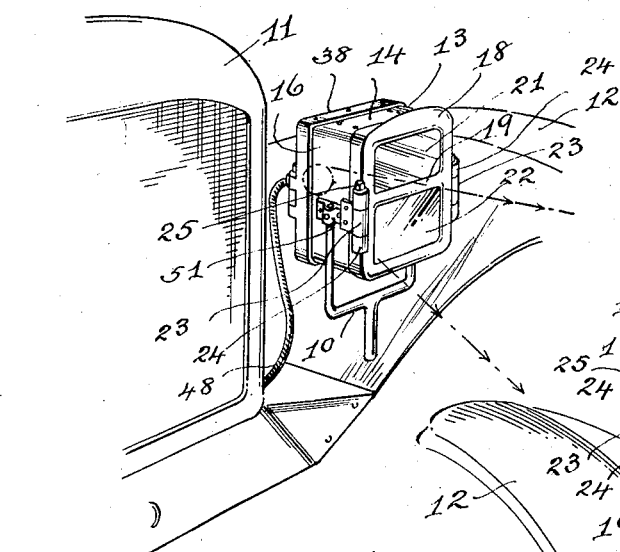
Fig. 1 shows a portion of the front of an an automobile with the improved lamp thereon and shown in perspective as viewed from the front.
Figure 2:
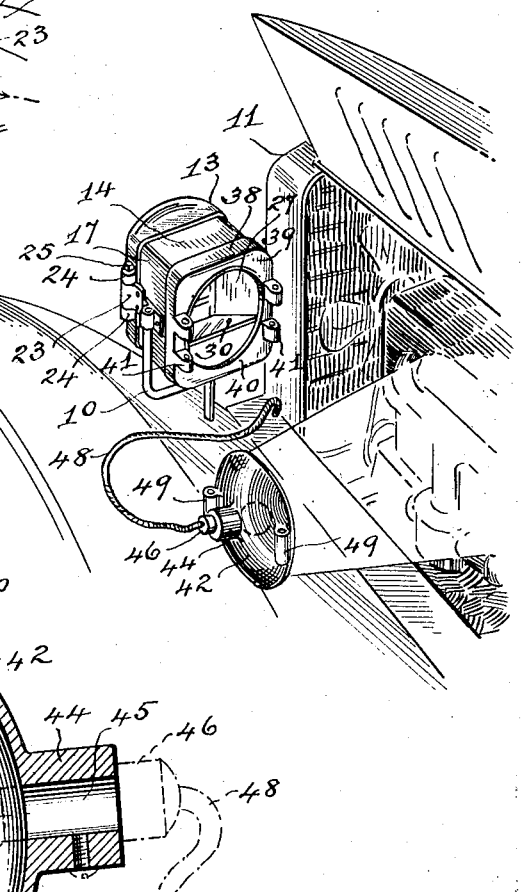
Fig. 2 illustrates the attached lamp in perspective as viewed from the rear thereof the same being shown in connection with the hood of an automobile and the lamp-carrier or holder being detached and in use to illuminate the engine parts.

Fig. 6 illustrates in plan view the top portion of an automobile hood, and mud-guard with the improved lamp in place between the two and indicates by full and broken lines the several positions to which the front lens frame and the rear lamp-carrier may be swung without detaching either of the same from the lamp-body, and Fig. 7 shows the detached lamp-body in rear elevation but on a scale similar to that employed in Figs. 1, 2 and 6.

Referring to the drawing, the numeral 10, designates a suitable double prong bracket attached to an automobile frame structure in any desirable manner and located adjacent to the radiator 11 and wheel-guard or fender 12. This bracket 10 is designed to rigidly sustain the improved lamp in the manner and by the means hereinafter to be explained.

In carrying out our invention, we provide a lamp-body 13, which may have any desired exterior shape, but which in the present instance is of a general rectangular shape in that it has a top wall 14; a bottom wall 15 and two side walls 16 and 17 respectively.

At the front of the lamp-body there is provided a lens frame 18 which latter is pivotally attached to said body and said frame, in the preferred form, is provided with a horizontal cross-bar 19. The frame and cross-bar also have rabbets 20 for the reception of the lenses 21 and 22 and a frame-plate 26 seats against the inner marginal edges of the lenses and is secured to the inner side of the frame whereby to hold said lenses in place.

In practice, we have found it advantageous to employ a ground or frosted glass for the upper lens 21 while a clear and good quality of window glass may be employed for the lens 22.

To each side wall 16 and 17 of the lamp-body, we rigidly secure, by rivets, an eye-bracket 23, of a hinge while at each side of the lens-frame 18, there are provided hinge-eyes 24. Suitable bolts 25, pass down through the upper hinge-eye 24, then through the eye-bracket 23 and finally screw into the lower hinge-eye 24 so that the lens-frame 18 will be held in place at the front end of the lamp-body by means of the two sets of eye-brackets, hinge-eyes and bolts.

By means of this construction of hinging the lens-frame at its opposite sides to the lamp-body, we provide a lens-frame which may be swung from either of its two opposite sides by merely withdrawing the bolt from that side which we desire to swing and the result is that the lamp-bodies may be mounted at either side of a vehicle without making them rights and lefts.

Figure 3:
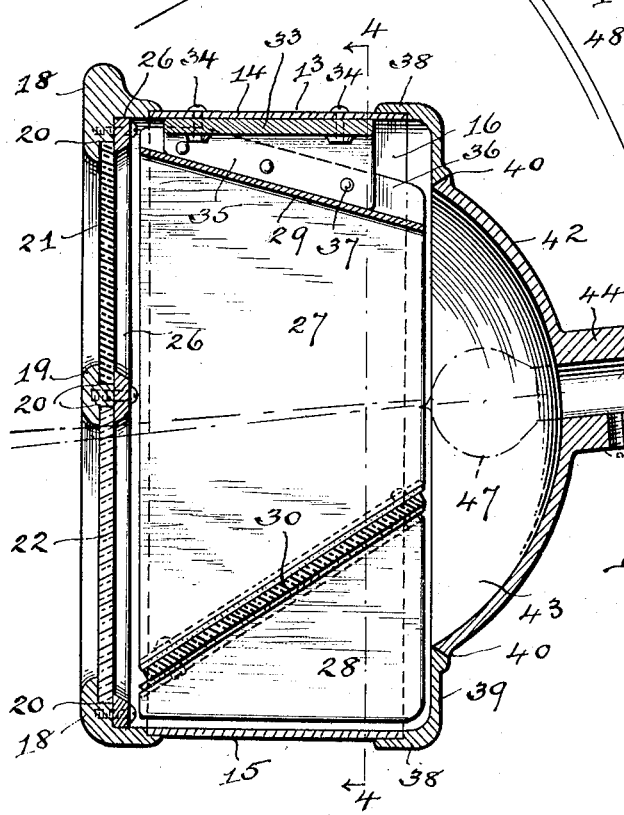
Fig. 3 shows an enlarged vertical sectional detail through the improved lamp-body.

On the interior of the lamp-body, as seen best in Figs. 3, 4 and 5 of the drawing, there is provided a projector frame which directs the light-rays. This frame comprises two upper vertical side plates 27; two lower vertical side plates 28, an upper fore and aft inclined top plate 29 and an inclined lower projecting plate 30.

The top plate 29 is inclined in a direction reverse to that in which the lower plate 30 is inclined and, in practice, we prefer to provide the under side of said top plate with a light-rays reflecting surface and this reflecting surface is therefore at the rear of the ground or frosted upper lens 21.

The lower inclined plate 30, is preferably a frosted or ground glass and is located at the rear of the plain lower lens 22 in the front of the lamp-body.

By reference to Figs. 3 and 4 of the drawings it will be noted that the lower edge of each upper vertical side plate 27 and the upper edge of each lower vertical side plate 28 are each inclined downwardly from rear to front and that each of those edges has an out-turned flange 31 so that the opposite side-edges of the glass plate 30, may project between the said flanges 31, and be clamped therebetween by means of threaded fastenings 32.

The entire projector-frame comprising the plates 27, 28, 29 and 30 are secured within the lamp-body by means of a connector-bar 33, which latter, as best shown in Fig. 4 of the drawing, extends horizontally beneath the top wall 14 of the lamp-body and is rigidly secured thereto by fastenings 34. The opposite ends 35 of the connector-bar turn down and snugly fit between up-turned flanges or ends 36 of the inclined top plate 29 so that rivets 37 may be passed through the ends 35 of the connector-bar; the flanges 36 of the top plate and also through the upper ends of the upper vertical side plates 16 and 17, and the projector-frame, thus, be rigidly secured in the lamp-body.

At the rear, the lamp-body is embraced by the flange 38 of a head-plate 39 so that the head-plate is rigidly carried at the rear of the body. This head-plate 39, as clearly shown in Fig. 2 of the drawing, is provided with a circular opening 40, the wall of the opening being slightly beveled as seen in Figs. 3 and 5 of the drawings.

At opposite sides of the circular opening 40 the head-plate 39 is provided with two spaced-apart hinge-eyes 41 for a purpose that will presently be explained.

To cover the opening 40 there is provided a circular reflector 42, the forward side 43 of which is concave and the circular edge of which reflector is beveled so as to snugly fit and form a tight joint with the beveled edge of the circular opening 40 in the head-plate when the reflector is fitted against the latter, as shown in Figs. 3 and 4 of the drawing.

The reflector 42 has a boss 44 projecting rearwardly therefrom through which a passage 45 extends and this passage is provided for the purpose of retaining a socket-member 46 in which an electric lamp-bulb 47 may be retained, the wires 48 serving to connect the lamp from any suitable source of current supply.

By reference to Fig. 3 of the drawing, it will be seen that the axis of the boss 44 and its passage 45, is inclined with respect to a horizontal axis through the lamp-body and the concave side of the reflector so that the lamp held in a socket in said passage will have an inclined instead of a horizontal position at the rear of the said lamp-body.

We have found in practice that by thus positioning the lamp in the reflector and at the rear of the plate 30 that we avoid projecting direct glaring rays ahead and that such rays as project forwardly and laterally through the lower lens 22 are softened or perhaps filtered, as it were, by the section of the inclined, ground or frosted glass 30 which however receives glaring rays from the upper plate 29.

Without going into theories of operation, we have found that in actual practice ample light for illuminating the road both in a lengthwise as well as a crosswise direction is projected from a lamp such as is disclosed herein and that all objectionable glare is eliminated.

The reflector is provided at opposite sides with hinge-lugs 49 which project between the eyes 41 on the head-plate 39 and pins 50 are passed through the eyes and lugs to hold the reflector in place against the head-plate.

By means of the eyes 41, lugs 49 and pins 50, the reflector is held in place so that by withdrawing one pin or the other the reflector may be swung away from the opening 40 in either direction and the lamp utilized to project a light rearwardly or laterally as indicated in full and broken lines in Fig. 6 of the drawing.

It will also be seen by reference to Fig. 2 of the drawing that by withdrawing both pins 50 the reflector 42 may be entirely detached from the head-plate 39 and the reflector with the lamp attached thereto may thus be made somewhat portable, limited only by the length of the wire 48.

Lugs 51 on opposite sides of the lamp body are provided to receive the bracket 10.

The fact that the front and rear closures are hinged to the body avoids the annoyance usually experienced with spring and frictionally held closures or clamping bands when it is necessary to open the lamp to replace the bulb, or for any other reason.

Having described our invention, we claim,—

1. In a vehicle lamp the combination with a lamp body, of a transparent closure at the front of the body, a reflector at the rear of the body, a projector frame in the body between the transparent closure and the reflector, said projector frame having straight sides which are connected at the top by a rearwardly and downwardly inclined flat top opaque plate and a rearwardly and upwardly inclined bottom translucent plate, and a lamp in front of the reflector.

2. In a vehicle lamp, the combination with a lamp body of a transparent closure at the front of the body, a reflector at the rear of the body, a projector frame in the body between the transparent closure and the reflector, said projector frame having upper and lower side plates with a flat light reflecting plate extending crosswise of the frame between said upper and lower side plates, and said projector frame also having an upper plate connecting its side plates and a lamp between the projector frame and the reflector.

3. In a vehicle lamp, the combination with a lamp body, of a closure at the front of the body, said closure comprising upper and lower plates, the upper plate being translucent and the lower plate transparent, a frame in the body, said frame having straight side walls which are connected by reversely inclined crosswise flat plates one of which is behind the translucent plate and the other behind the transparent plate, a reflector at the rear of the side and cross plates of said frame, and a lamp between said frame and the reflector.

4. In a vehicle lamp the combination with a lamp body having a front and a rear opening, of a transparent closure at the front of the body, a plate at the rear of the body and having an opening therein, projector plates in the body between the rear plate and the front transparent closure, hinge members on the body at opposite sides of the said rear opening, a reflector having hinge members at its opposite sides, said reflector closing said rear opening and having its hinge members engaging the hinge members on the body, means for detachably engaging said hinge members so the reflector may be swung from either side of said rear opening or entirely disconnected, and a lamp carried by the hinged reflector.

In testimony whereof we affix our signatures.

LAURITZ C. GARMAN.
WALTER M. COLEMAN.